Nov. 21, 1944.   F. J. VIERLING   2,363,165
MEASURING INSTRUMENT
Filed May 22, 1943
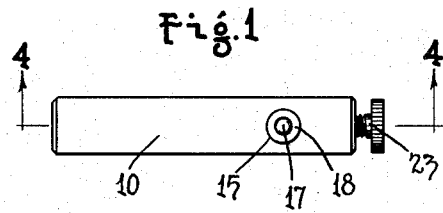
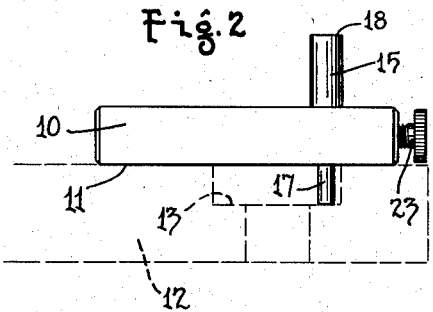
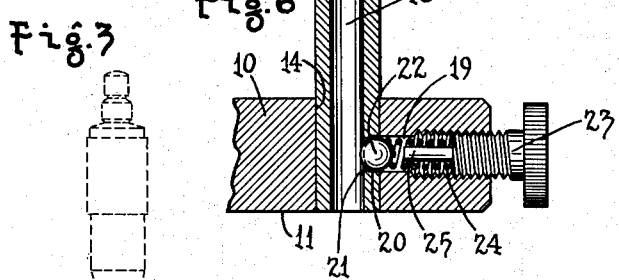
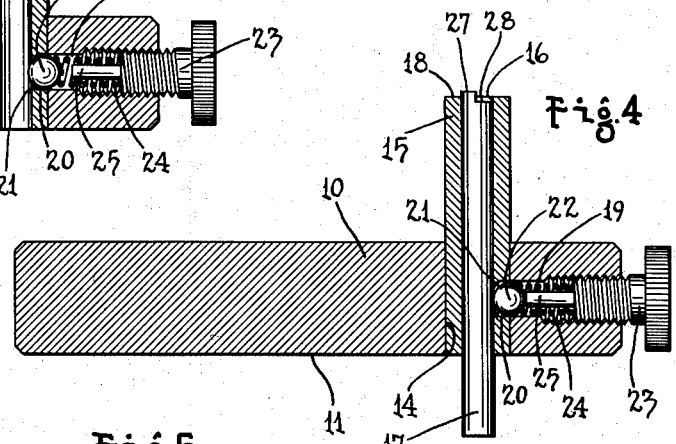
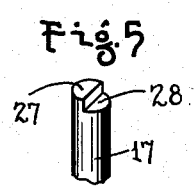
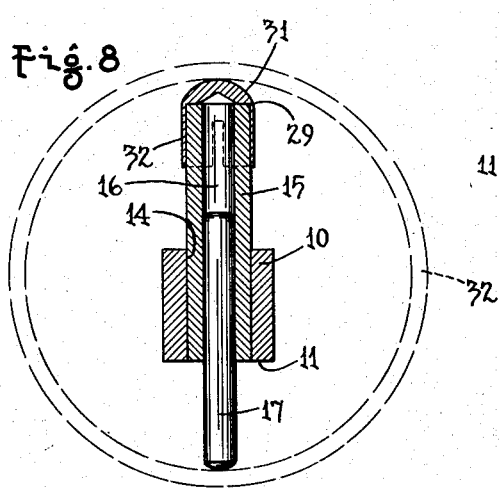
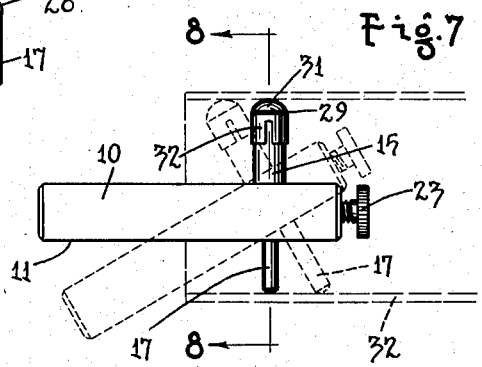
Inventor
Frank J. Vierling
By Caswell & Lagaard
Attorneys Patented Nov. 21, 1944

2,363,165

UNITED STATES PATENT OFFICE 2,363,165

MEASURING INSTRUMENT

Frank J. Vierling, Minneapolis, Minn., assignor to M. M. Liederbach, Minneapolis, Minn.

Application May 22, 1943, Serial No. 488,043

3 Claims. (Cl. 33—169)

My invention relates to improvements in measuring instruments and pertains more especially to the type of gauge for measuring depths and to such a gauge that is convertible for measuring internal diameters.

An object of the present invention is to provide an improved gauge of simple, durable and inexpensive construction and one that may be conveniently and accurately used in making various measurements including depths and internal diameters.

Other objects of the invention reside in the novel combination and arrangement of parts and in the details of construction hereinafter illustrated and/or described.

In the accompanying drawing, Fig. 1 is a plan view of a gauge in embodiment of a form of my invention; Fig. 2 is a side elevational view of the gauge shown in Fig. 1, said gauge being shown as applied to a piece of work in the measurement of a depression therein; Fig. 3 is an end elevational view of the gauge shown in Figs. 1 and 2, said gauge being shown as applied to a micrometer; Fig. 4 is an enlarged longitudinal, sectional view taken as on the line 4—4 of Fig. 1, the measuring rod in this view being of the form having dual gauging surfaces at its upper end; Fig. 5 is a fragmentary perspective view of the form of measuring rod shown in Fig. 4; Fig. 6 is a fragmentary sectional view similar to Fig. 4, but without a measuring rod; Fig. 7 is a side elevational view of the device shown within a tube and as converted for use in measuring the internal diameter of such a structure, and Fig. 8 is an enlarged sectional view taken as on the line 8—8 of Fig. 7.

Reference being had to the drawing wherein similar parts are designated by similar reference characters throughout the several views, it will be understood that the illustrated form of my invention includes a metallic block or stock 10 of oblong foundation, the same having a planiform machined contacting surface 11 at the bottom thereof which is applied to an object, one such object or piece of work 12 being shown in dotted lines in Fig. 2 and having a depression 13, the depth whereof is to be measured. An opening 14 is drilled through the block 10 from top to bottom and a hollow post 15 is press-fitted into said opening, the space in the interior of said hollow post constituting a guideway 16 in which a measuring rod 17 is longitudinally slidable. At the upper end of the post 15 is a planiform gauging surface 18 paralleling the contacting surface 11 with respect to which the axis of said guideway 16 is perpendicular.

The post 15 is nearer one end of the block 10 than the other and formed in said near end of said block is a bore 19, the axis of which intersects the axis of the guideway 16 at right angles, the outer portion of said bore 19 being internally threaded. Said post 15 has a transverse bore 20 therein in continuation of the bore 19 in the block, said bore 20 opening into the guideway 16 and being reduced adjacent to said guideway to form a stop 21 for a rod-engaging member 22 accommodated within said bores 19, 20. This rod-engaging member 22 may take the form of a ball, as shown, and, while held by the stop 21 against entry into the guideway 16, will project slightly into said guideway and engage the side of a measuring rod 17 disposed therein. A screw 23, conveniently turned by the fingers, is threaded into the threaded portion of said bore 19 in said block 10. Received within said bore 19 is a compressed helical spring 24, the inner end thereof bearing against the ball 22 and the outer end thereof being backed against the screw 23. This spring 24 urges the ball 22 against the measuring rod 17 causing it to be yieldingly frictionally held in whatever position it may be urged into longitudinally of the guideway 16. The screw 23 is formed with an axial reduced portion or tip 25 accommodated within the helical spring 24 axially thereof. This tip 25 constitutes an abutment which, upon the turning of the screw 23, may be advanced against the ball 22 to bring it to bear firmly against the measuring rod 17 and thus rigidly secure said rod against displacement from position in which it may have been initially yieldingly held through the action of the spring 24 alone.

The guideway 16 in the post 15 is cross-sectionally proportioned to receive round rods of stock material, suitably, one-eighth inch stock. These rods may be conveniently cut into desired lengths by the user of the device and for many purposes will be roughly less than one inch under the dimension to be measured. With such a rod applied to the block 10 and squared-off at its lower end, the instrument will be used, for example, as shown in Fig. 2 where the depth of the depression 13 is to be measured. With the screw 23 loosened to disengage the abutment-tip 25 from the ball 22, leaving only the spring 24 in abutment therewith, the block 10 will be applied to the piece of work 12 bringing the lower end of the rod 17 against the bottom of the depression 13. Pressure then brought to bear upon the block will cause the sliding of the rod 17 upwardly into the post 15 until the face 11 of the block 10 contacts the outer surface of said piece of work. The screw 23 is then turned to advance its tip 25 against the ball 22, which, already engaging the rod 17 under the action of the spring 24, is forced firmly against said rod rigidly to secure it in its adjusted position. The instrument is then applied to calipers or micrometers 26, as shown in Fig. 3, the micrometer reading showing the depth of the depression 13 plus the one-inch, or other predetermined distance, between the contacting surface 11 of the block 10 and the gauging surface 18 at the upper end of the post 15.

My improved instrument is conveniently utilized in checking measurements within certain limits greater or less than a specified dimension. For such purpose, a measuring rod 17 (Figs. 4 and 5) is prepared by cutting away an upper portion thereof in step-like fashion to provide an upper gauging surface 27 and a lower gauging surface 28, both paralleling the gauging surface 18 of the post 15. The distance from the upper gauging surface 27 of the rod 17 to the lower end thereof will be equal to the specified dimension being verified, plus the permitted tolerance over that dimension plus the one-inch or other known distance between the surface 11 at the bottom of the block 10 and the surface 18 at the top of the post 15. The distance from the lower gauging surface 28 of the rod 17 to the lower end thereof will be equal to the specified dimension, less the permitted tolerance under that dimension, plus the one-inch or other known distance between said gauging surfaces 11, 18. Having applied the instrument to a piece of work with the result, say as shown in Fig. 4, the user will need no micrometer in his calculations, but will compare, by sight or touch, the disposition of the rod-surfaces 27, 28 relative to gauging surface 18 on the post 15. If the upper rod surface 27 is beneath the post surface 18, the maximum tolerance has been exceeded and, if the lower rod-surface 28 is above the post surface 18, the minimum tolerance has been exceeded. If, however, the upper rod surface 27 is above and the lower rod surface 28 beneath said post surface 18, the measurement will be between the tolerated maximum and minimum limits.

The present instrument is also conveniently utilized in measuring internal diameters, its conversion or adaptation to such use requiring only the rounding of the lower end of the measuring rod and the application of removal cap, as at 29, to the post 15. This cap 29 includes a head with a rounded gauging surface 31 and a split skirt 32 adapted frictionally to slip over the upper end of said post 15. The high point on the rounded surface 31 of the cap 29 and the low point on the rounded lower end of the rod 17 will, of course, lie in the axis of said rod. Upon seeking the measurement of an internal diameter such as that of a tube 32 (Figs. 7 and 8), the instrument with cap 29 attached will be inserted into the tube in a relatively biased position (dotted lines, Fig. 7), the measuring rod 17 being excessively extended for the measurement. Thence, the instrument will be squared with the tube, whereupon the low point on the rounded end of the rod 17 and the high point on the rounded gauging surface 31 of the cap 29 will find the low and high point, respectively, of the inner surface of said tube, the rod 17 yieldingly sliding into its guideway 16 in the post 15 during such process. Thence, the instrument will be returned to its biased position and withdrawn from the tube. After setting the screw 23 with its abutment-tip 25 against the ball 22, the instrument will be applied to a micrometer after the fashion of its application to such calipers, as shown in Fig. 3, and the reading thereon will show the internal diameter of the tube.

From the foregoing, it will be appreciated that the present instrument, although of exceedingly simple and inexpensive construction, will durably function conveniently and accurately to meet diverse needs of mechanics dealing with work in which great precision is required.

Changes in the specific form of my invention, as herein described, may be made within the scope of what is claimed without departing from the spirit of my invention.

Having described my invention, what I claim as new and desire to protect by Letters Patent is:

1. Clamping means for a measuring instrument including a block and a post fitted in said block and formed with an axial guideway therein, such instrument further including a measuring rod longitudinally slidable in said guideway and said block and post having axially aligned bores therein disposed at right angles to said guideway, the bore in the post communicating with said guideway and the bore in the block opening to the exterior thereof, said clamping means comprising a ball contained, in part, within said bore in said block and, in part, within said bore in said post, said latter bore being reduced adjacent to said guideway to form a stop for the ball enabling it to project into said guideway and to engage the measuring rod therein, but preventing its passage into the guideway in the absence of the measuring rod therefrom, a screw threaded in said bore in said block, a helical spring in said last mentioned bore bearing at its inner end against said ball and backed at its outer end against said screw, said ball being pressed by said spring into engagement with said rod and serving yieldingly to hold the rod in its various longitudinally assumed positions relative to said block, said screw having a terminal abutment accommodated axially within said helical spring and adapted to be advanced against the ball, upon the turning of the screw, to clamp said ball against said rod and thus firmly secure the same in any position in which it may be yieldingly held through the action of said spring.

2. Clamping means for a measuring instrument including a block formed with a guideway therein and with a bore at right angles thereto communicating therewith and opening to the exterior of the block, such instrument further including a measuring rod longitudinally slidable in said guideway, said clamping means comprising a rod-engaging member movable in said bore, a screw threaded in the bore, a spring within said bore interposed, under compression, between said rod-engaging member and screw, said rod-engaging member being pressed by said spring into engagement with said rod and serving yieldingly to hold the rod in its various longitudinally assumed positions relative to said block, said screw being adapted to be turned against said rod-engaging member and to clamp it against said rod firmly to secure the same in any position in which it may be yieldingly held through the action of said spring.

3. Clamping means for a measuring instrument including a block formed with a guideway therein and having a measuring rod longitudinally slidable in said guideway, said clamping means comprising a member spring-pressed against said rod and serving yieldingly to hold the same in its various longitudinally assumed positions relative to said block, and a clamp screw adapted to be turned against said member and to clamp it against said rod.

FRANK J. VIERLING.